United States Patent
Angle et al.

(10) Patent No.: US 7,099,130 B2
(45) Date of Patent: Aug. 29, 2006

(54) VOLTAGE MONITOR FOR GROUND FAULT CIRCUIT INTERRUPTER

(75) Inventors: Jeffrey R. Angle, Newbury, OH (US); Philip E. Bearden, Brunswick, OH (US)

(73) Assignee: Ericson Manufacturing Company, Willoughby, OH (US)

( * ) Notice: Subject to any disclaimer, the term of this patent is extended or adjusted under 35 U.S.C. 154(b) by 413 days.

(21) Appl. No.: 10/346,995

(22) Filed: Jan. 17, 2003

(65) Prior Publication Data

US 2004/0141265 A1    Jul. 22, 2004

(51) Int. Cl.
*H02H 3/00* (2006.01)
(52) U.S. Cl. .......................... 361/44; 361/42
(58) Field of Classification Search ............ 361/42–50
See application file for complete search history.

(56) References Cited

U.S. PATENT DOCUMENTS

| | | | |
|---|---|---|---|
| 4,068,276 A * | 1/1978 | Pintell | 361/46 |
| 4,080,640 A * | 3/1978 | Elms et al. | 361/45 |
| 4,663,690 A * | 5/1987 | Bonniau et al. | 361/44 |
| 5,224,006 A * | 6/1993 | MacKenzie et al. | 361/45 |
| 5,708,548 A * | 1/1998 | Greeve et al. | 361/42 |
| 5,841,615 A | 11/1998 | Gershen | |
| 5,859,756 A * | 1/1999 | Pressman et al. | 361/90 |
| 5,894,392 A | 4/1999 | McDonald | |
| 6,212,048 B1 | 4/2001 | Chaundhry | |
| 6,407,469 B1 * | 6/2002 | Cline et al. | 307/11 |
| 6,473,281 B1 * | 10/2002 | Kornblit | 361/42 |
| 6,476,509 B1 * | 11/2002 | Chen et al. | 290/1 R |
| 2002/0071227 A1 | 6/2002 | Duve | |
| 2002/0089799 A1 | 7/2002 | Juncu | |
| 2002/0181175 A1 | 12/2002 | Baldwin | |

\* cited by examiner

*Primary Examiner*—Brian Sircus
*Assistant Examiner*—Danny Nguyen
(74) *Attorney, Agent, or Firm*—Jones Day

(57) ABSTRACT

A voltage monitor module is operable to monitor a characteristic of an input voltage to a Ground Fault Circuit Interrupter (GFCI) device and generate a fault signal that causes the GFCI device to enter a de-energized state when the characteristic of the input voltage is not within a defined tolerance.

49 Claims, 7 Drawing Sheets

VOLTAGE MONITOR FOR GROUND FAULT CIRCUIT INTERRUPTER

BACKGROUND

1. Field of the Invention

The invention relates generally to safety and protection circuits, and in particular to ground fault protection circuits.

2. Description of the Related Art

A Ground Fault Circuit Interrupter (GFCI) is a device that is operable to de-energize a circuit in response to the detection of a ground fault condition at an AC load. The GFCI device has a pair of load side phase and neutral terminals, and also has a pair of line side phase and neutral terminals. The GFCI device is operable to enter a de-energized state to isolate an AC load connected to the load side terminals from the line side terminals upon detecting a ground fault condition. GFCI devices are usually designed according to accepted standards, such as UL 943, entitled "UL Standard for Ground-Fault Circuit-Interrupters"; UL 1053, entitled "UL Standard for Safety for Ground-Fault Sensing and Relaying Equipment"; and UL 1640, entitled "UL Standard for Safety for Portable Power-Distribution Equipment," for example. These standards define various operating specifications and ratings of GFCI devices.

A GFCI device may be used in a single phase circuit, such as a single phase 120V AC circuit, or in a polyphase circuit, such as 120/240V AC circuit. The GFCI device typically detects the ground fault condition by sensing a current imbalance between the phase and neutral terminals caused by a ground fault current. When the current imbalance exceeds a threshold, the GFCI device enters the de-energized state that isolates the AC load from the line side phase and neutral terminals. The current imbalance threshold is typically defined by the class rating of the GFCI device. A Class A GFCI device, for example, trips when the ground fault current exceeds 5 mA, and a Class B GFCI device trips when the ground fault current exceeds 20 mA.

Known GFCI devices may malfunction when the line side power signal is not within a defined tolerance. For example, in the event of a damaged neutral line, such as in a 120/240 polyphase circuit, a Class A GFCI device may fail to provide rated protection. A load imbalance on the load side may cause the line to neutral voltage to likewise become imbalanced, resulting in an overvoltage or undervoltage condition that may cause the GFCI device to malfunction. Accordingly, the GFCI device may fail to provide its rated protection. Additionally, known GFCI devices may not provide protection from an overvoltage or undervoltage condition on the line side, as the GFCI device is typically designed to trip based on a ground fault condition, and is not designed to trip based on a overvoltage or undervoltage condition.

SUMMARY

An interrupter circuit for connecting a load on a load side to a power source on a line side includes a Ground Fault Circuit Interrupter (GFCI) circuit and a voltage monitor module. The GFCI circuit comprises line side phase and neutral terminals, load side phase and neutral terminals, and control circuitry interposed between the line side phase and neutral terminals and the load side phase and neutral terminals. The control circuitry is operable to monitor a current imbalance in the load side phase and neutral terminals and enter a de-energized state that isolates the load from the power source when the current imbalance exceeds a threshold. The voltage monitor module is operable to monitor a voltage between the line side phase and neutral terminals and generate a fault signal that causes the GFCI circuit to enter the de-energized state when the voltage between the line side phase and neutral terminals is not within a defined tolerance.

A voltage monitor module for activating a GFCI circuit having load side phase and neutral terminals and line side phase and neutral terminals and operable to enter a de-energized state to isolate a load connected to the load side phase and neutral terminals from the line side phase and neutral terminals includes monitoring circuitry coupled to the line side phase and neutral terminals. The monitoring circuitry is operable to monitor the voltage between the line side phase and neutral terminals and generate a fault signal that causes the GFCI circuit to enter a de-energized state when the voltage between the line side phase and neutral terminals is not within a defined tolerance.

A system for generating a fault signal to activate a GFCI circuit having load side phase and neutral terminals and line side phase and neutral terminals and operable to enter a de-energized state to isolate a load connected to the load side phase and neutral terminals from the line side phase and neutral terminals includes monitoring means and coupling means. The monitoring means is for monitoring the voltage between the line side phase and neutral terminals of the GFCI circuit and for generating a fault signal when the voltage between the line side phase and neutral terminals is not within a defined tolerance. The coupling means is for coupling the monitoring means to the GFCI circuit.

A method for generating a fault signal to activate a GFCI circuit having load side phase and neutral terminals and line side phase and neutral terminals and operable to enter a de-energized state to isolate a load connected to the load side phase and neutral terminals from the line side phase and neutral terminals includes the step of monitoring the voltage between the line side phase and neutral terminals of the GFCI circuit and comparing the monitored voltage to a tolerance criteria. When the monitored voltage between the line side phase and neutral terminals does not meet the tolerance criteria, a fault signal that causes the GFCI circuit to enter the de-energized state is generated.

DETAILED DESCRIPTION

Figure 1:
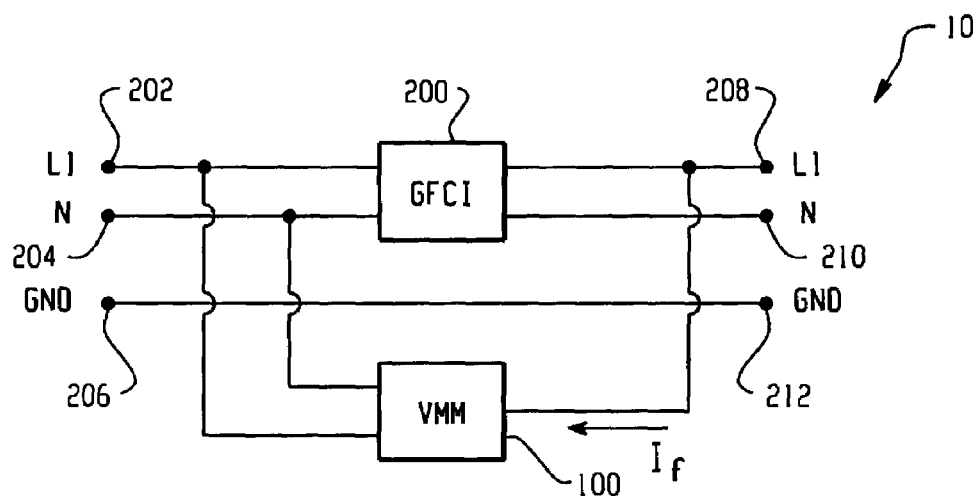
FIG. 1 is a block diagram of an interrupter circuit comprising a voltage monitor module and a GFCI device in a single phase system.

FIG. 1 is a block diagram of an interrupter circuit 10 comprising a voltage monitor module 100 and a GFCI device 200 implemented in a single phase system. The GFCI device 200 comprises a line side phase terminal 202 and a line side neutral terminal 204 referenced to a ground 206. A power source, such as 120V AC power, is provided to the line side phase and neutral terminals 202 and 204. A load side phase terminal 208 and a load side neutral terminal 210 are also referenced to ground 212 and receive an AC load.

Figure 2:
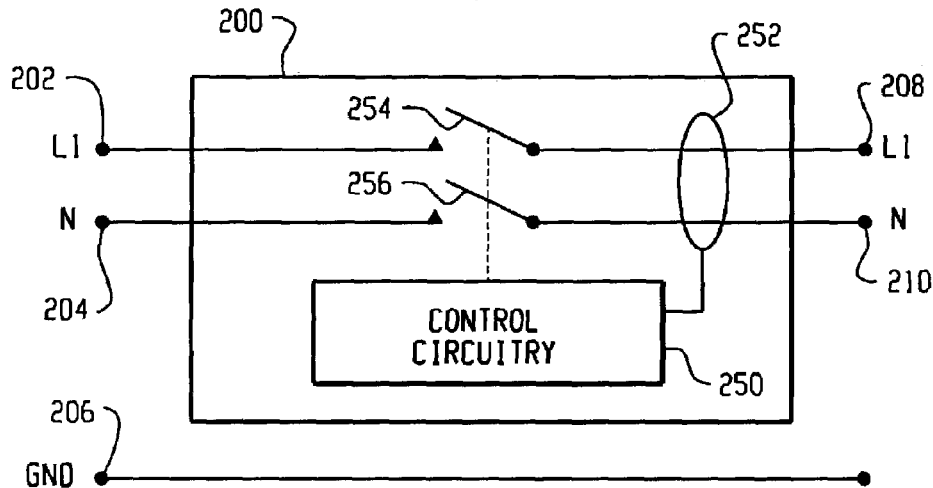
FIG. 2 is a block diagram of a GFCI device.

The GFCI device 200 may be a standard GFCI device, such as Class A rated GFCI receptacle for use in a residential environment, or in a portable multiple outlet GFCI device, such as those manufactured by Ericson Safety Electrical Specialties of Willoughby, Ohio, USA. FIG. 2 provides a block diagram of an exemplary GFCI device 200. The GFCI device 200 includes control circuitry 250 operable to monitor a current imbalance in the load side phase and neutral terminals 208 and 210. The control circuitry 250 may comprise a microprocessor, or alternatively may comprises an analog or digital logic circuit.

The control circuitry 250 typically utilizes a sensing device 252, such as a differential current transformer, to measure the current imbalance between the load side phase and neutral terminals 208 and 210. When the current imbalance exceeds a threshold, the control circuitry 250 opens switches 254 and 256 to enter a de-energized state that isolates a load connected to the load side phase and neutral terminals 208 and 210 from the power source on the line side phase and neutral terminals 202 and 204. The current imbalance threshold typically depends on the rating, or class, of the GFCI device 200. For example, in a Class A GFCI device, the current imbalance threshold is 5 mA.

Normally, a typical GFCI device 200 detects the ground fault currents as described above. However, in the event of significant supply voltage variation, the line-to-neutral voltage between the line side phase and neutral terminals 202 and 204 may vary from normal operating conditions and result in an overvoltage or undervoltage condition. The overvoltage or undervoltage conditions may cause the GFCI device 200 to malfunction and be unable to monitor the current imbalance between the load side phase and neutral terminals 208 and 210. Furthermore, the overvoltage or undervoltage condition resulting from the supply voltage variation may cause damage to an AC device drawing power from the load side phase terminal 208.

The voltage monitor module 100 may be combined with the GFCI device 200 to provide undervoltage and overvoltage interrupt protection and maintain GFCI interrupt protection in the event of an undervoltage condition or overvoltage condition caused by supply voltage variation. The voltage monitor module 100 is operable to monitor a voltage between the line side phase and neutral terminals 202 and 204 and generate a fault signal that causes the GFCI device 200 to enter the de-energized state when the voltage between the line side phase and neutral terminals 202 and 204 is not within a defined tolerance.

In one embodiment, the fault signal is provided to a fault circuit that induces a fault between the load side phase terminal 208 and the line side neutral terminal 204, and the induced fault has a fault current of $I_f$. The induced fault causes a current imbalance of $I_f$ between the load side phase and neutral terminals 208 and 210. The fault current $I_f$ is of a magnitude large enough to cause the GFCI device 200 to enter the de-energized state.

Accordingly, the voltage monitor module 100 operates such that the GFCI device 200 and downstream load(s) may always operate within their rated voltage range to maintain GFCI protection and provide isolation protection in the event of an overvoltage or undervoltage condition. Furthermore, because the voltage monitor module 100 may be combined with existing GFCI devices, costs associated with redesigning or modifying existing GFCI devices are reduced or eliminated.

Figure 3:
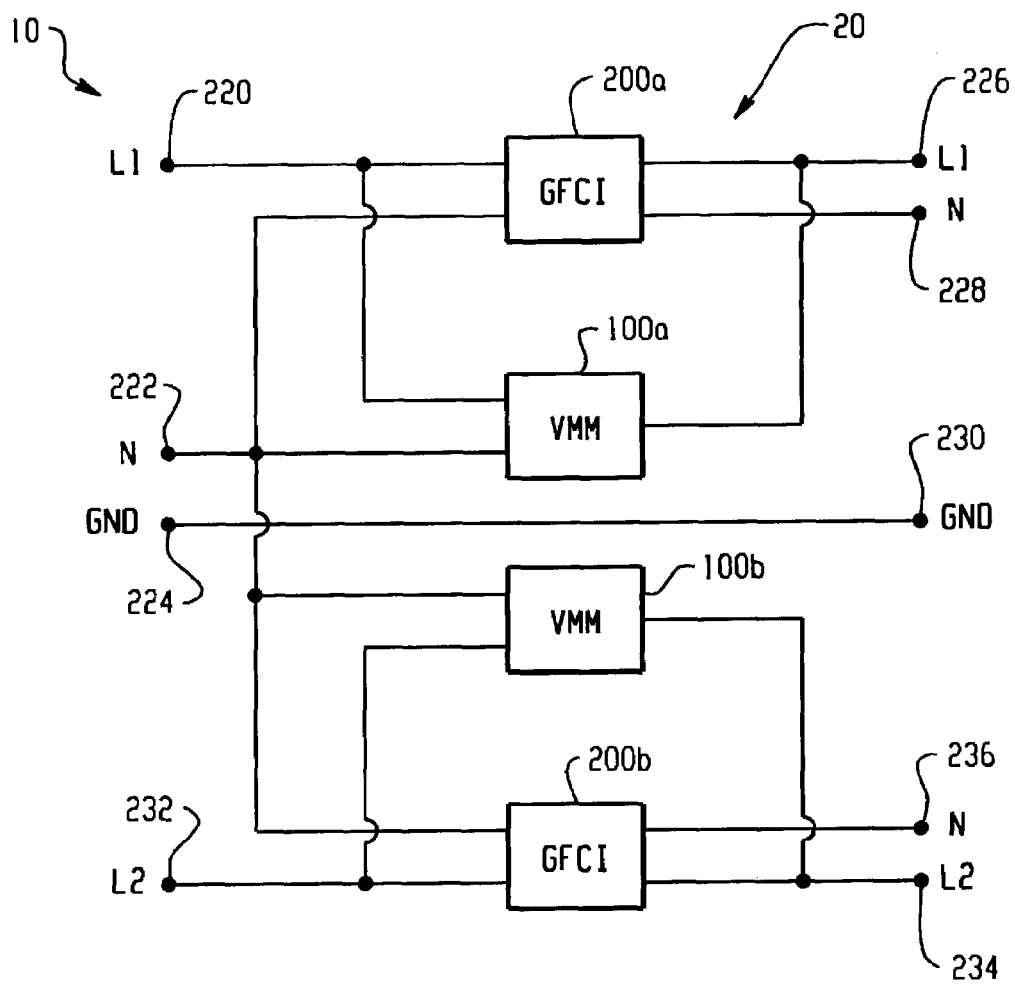
FIG. 3 is a block diagram of an interrupter circuit comprising voltage monitor modules and GFCI devices in a polyphase system.

The voltage monitor module 100 may also be used with GFCI devices 200 in a polyphase system. FIG. 3 provides a block diagram of an interrupter circuit 20 comprising voltage monitor modules 100a and 100b and GFCI devices 200a and 200b in 120/240V AC circuit. A first line side phase terminal 220 and a line side neutral terminal 222 provide a first input phase, and a first load side phase terminal 226 and first load side neutral terminal 228 provide a first load side output phase. Similarly, a second line side phase terminal 232 and the line side neutral terminal 222 provide a second input phase, and a second load side phase terminal 234 and a second load side neutral terminal 236 provide a second load side output phase.

Under a normal operating condition, first and second phase voltages are balanced across the first line side phase terminal 220 and the line side neutral terminal 222, and the second line side phase terminal 232 and the line side neutral terminal 222, respectively. Likewise, the first and second phase voltages are also balanced across the first load side phase terminal 226 and first load side neutral terminal 228 and the second load side phase terminal 234 and the second load side neutral terminal 236, respectively. During this normal operating condition, the GFCI device 200a provides GFCI protection for the first phase, and the GFCI device 200b provides GFCI protection for the second phase.

However, in the event of a fault in the neutral 222, then the first and second phase voltages may become unbalanced and vary arbitrarily. For example, if a load on the first load side phase and neutral terminals 226 and 228 is not balanced with a load on the second load side phase and neutral terminals 234 and 236, then the first and second phase voltages may vary in proportion to the load imbalance, resulting in an overvoltage on one phase and an undervoltage on another phase. As a result, the GFCI devices 200a and 200b may malfunction and be unable to monitor the current imbalances between their respective load side phase and neutral nodes.

And finally, independent of the status of the line side neutral 222, an overvoltage or undervoltage condition will not typically cause the GFCI devices 200a and 200b to enter a de-energized state, and thus AC devices are not protected from overvoltage or undervoltage conditions by GFCI devices 200a and 200b. Possible equipment damage from the voltage imbalance may also result.

Combining the voltage monitor modules 100a and 100b with the GFCI devices 200a and 200b provides overvoltage and undervoltage interrupt protection and maintains GFCI interrupt protection in the event of voltage variation caused by an open neutral condition or in the event of any other undervoltage or overvoltage condition. The voltage monitor modules 100a and 100b are operable to monitor the voltage between the first line side phase and neutral terminal 220 and 222 and the second line side phase and neutral terminal 232 and 222, respectively, and generate corresponding signals to de-energize the GFCI devices 200a and 200b as required.

Accordingly, the interrupter circuit 20 provides polyphase overvoltage and undervoltage interrupter protection and maintains polyphase GFCI protection in the event of an open neutral condition, or in the event of any other overvoltage or undervoltage condition.

Figure 4:
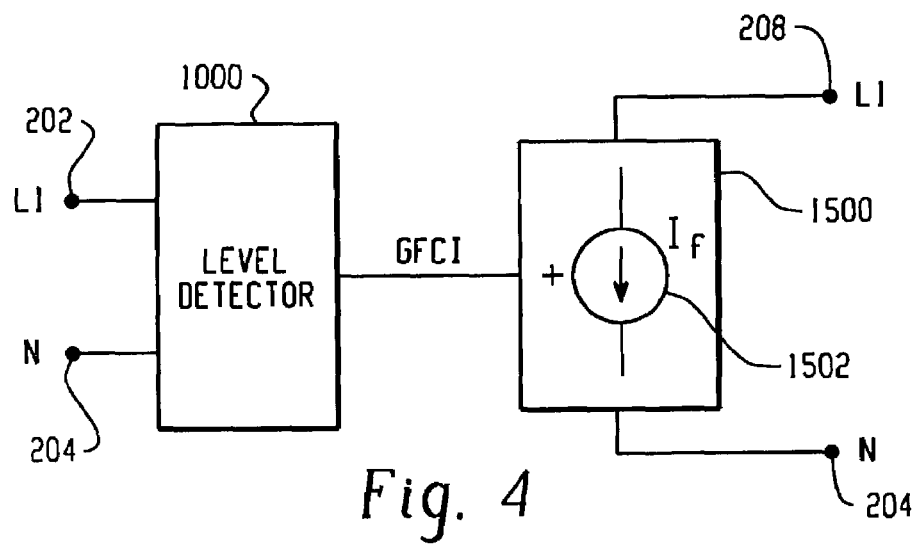
FIG. 4 is a block diagram of an embodiment of the voltage monitor module.

FIG. 4 provides a block diagram of an embodiment of a voltage monitor module 100. The voltage monitor module 100 comprises a level detector 1000 coupled between the line side phase and neutral terminals 202 and 204, and a fault circuit 1500 coupled between the load side phase terminal 208 and the line side neutral terminal 204.

The level detector 1000 is illustratively a device that produces a change in output at a prescribed input level. The level detector 1000 is operable to monitor the voltage between the line side phase and neutral terminals 202 and 204 and generate a fault signal when the voltage between the line side phase and neutral terminals 202 and 204 is not within a defined tolerance. The defined tolerance may be an overvoltage value, an undervoltage value, or a voltage window defined by an overvoltage value and an undervoltage value.

The GFCI fault signal is provided to the fault circuit 1500. The fault circuit 1500 generates a fault current that causes the GFCI device 200 to enter a de-energized state. In one embodiment, the fault current $I_f$ is created by a current drain 1502 interposed between the load side phase terminal 208 and the line side neutral terminal 204. Upon receiving the fault signal, the current drain 1502 draws a fault current $I_f$ from the load side phase terminal 208, resulting in a current imbalance of $I_f$ between the load side phase terminal 208 and load side neutral terminal 210. The fault current $I_f$ is of a magnitude large enough to cause the GFCI device 200 to enter the de-energized state.

Figure 5:
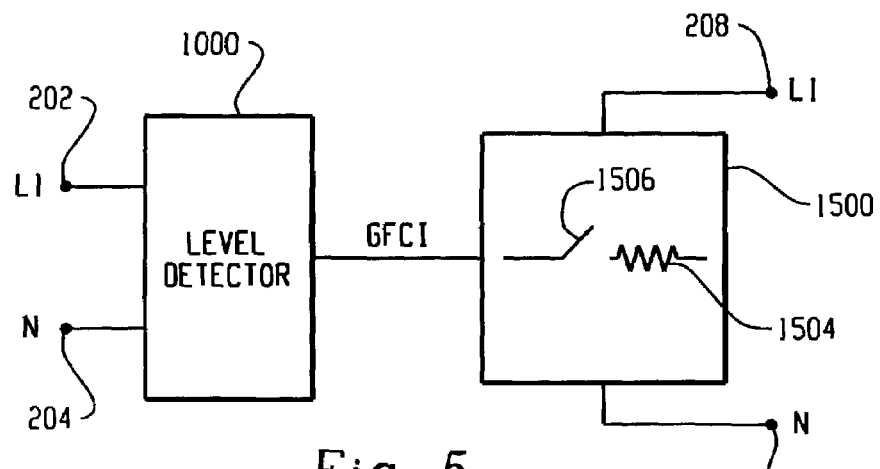
FIG. 5 is a block diagram of another embodiment of the voltage monitor module.

FIG. 5 is a block diagram of another embodiment of the voltage monitor module 100. The embodiment of FIG. 5 is similar to that of FIG. 4, except that the fault circuit 1500 comprises a resistor 1504 in series with a switch 1506. The series connected resistor 1504 and switch 1506 are interposed between the load side phase terminal 208 and the line side neutral terminal 204. The switch 1506 closes when a GFCI signal is generated, inducing a fault current If. The magnitude of the fault current $I_f$ is determined by the voltage between the load side phase terminal 208 and the line side neutral terminal 204 and the resistance of the resistor 1504. The resistor 1504 is preferably selected so that the magnitude of $I_f$ is large enough to cause the GFCI device 200 to enter the de-energized state when the switch 1506 closes.

Figure 6:
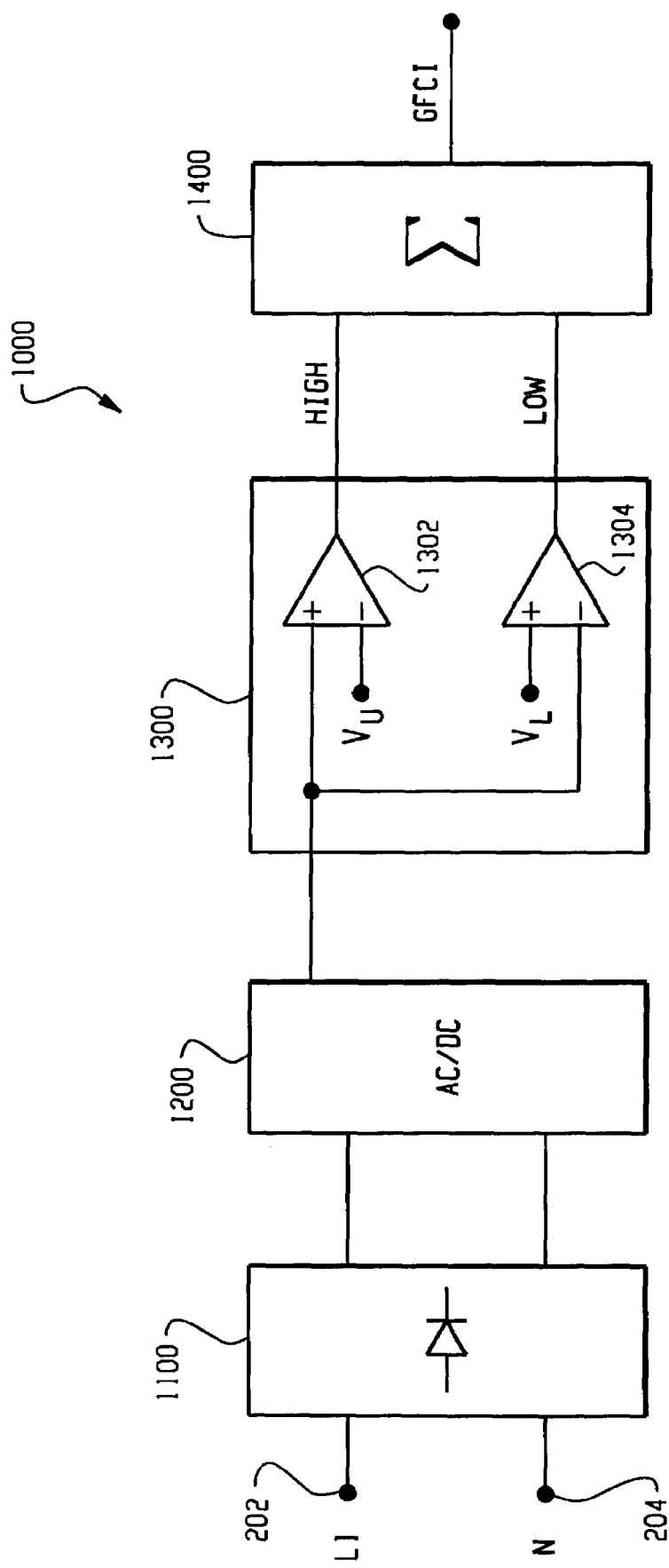
FIG. 6 is a block diagram an embodiment of a voltage monitor module level detector.

FIG. 6 is a block diagram embodiment of a voltage monitor module level detector 1000. The level detector 1000 comprises a rectifier circuit 1100, an AC/DC converter circuit 1200, a comparator circuit 1300, and a summing circuit 1400.

The rectifier circuit 1100 is coupled between the line side phase and neutral terminals 202 and 204 and is operable to generate and output a rectified power signal. The AC/DC converter circuit 1200 is coupled to the output of the rectifier circuit 1200 and is operable to generate a DC voltage signal proportional to the magnitude of the rectified power signal.

The comparator circuit is coupled to the AC/DC converter circuit 1300 and receives the DC voltage signal that is proportional to the rectified power signal. The comparator circuit 1300 provides an output signal when the DC voltage signal indicates that the voltage between the line side phase and neutral terminals 202 and 204 is not within a defined tolerance. The defined tolerance may be an overvoltage value, an undervoltage value, or a voltage window defined by an overvoltage value and an undervoltage value.

In the illustrative embodiment shown in FIG. 6, the comparator circuit 1300 compares the DC voltage signal output by the AC/DC converter circuit 1200 to an upper DC voltage threshold $V_U$ and a lower DC voltage threshold $V_L$. The upper DC voltage threshold $V_U$ corresponds to an overvoltage limit, and the lower DC voltage threshold $V_L$ corresponds to an undervoltage limit. The comparator circuit 1300 is operable to generate an upper limit signal when the DC voltage signal is greater than the upper DC voltage threshold $V_U$, and generate a lower limit signal when the DC voltage signal is less than the lower DC voltage threshold $V_L$.

In one embodiment, the comparator circuit 1300 comprises a first comparator 1302 and a second comparator 1304. The first comparator is coupled to the AC/DC converter circuit 1200 and is configured to receive the DC voltage signal and compare the DC voltage signal to the upper DC voltage threshold $V_U$ and generate the upper limit signal when the DC voltage signal is greater than the upper DC voltage threshold $V_U$. Likewise, the second comparator 1304 is coupled to the AC/DC converter circuit and is configured to receive the DC voltage signal and compare the DC voltage signal to the lower DC voltage threshold $V_L$ and generate the lower limit signal when the DC voltage signal is less than the lower DC voltage threshold $V_L$.

If the defined tolerance is a voltage window defined by an overvoltage value and an undervoltage value, and the comparator circuit 1300 is operable to generate an upper limit signal and a lower limit signal, then the output of the comparator circuit 1300 may be provided to the summing circuit 1400, which, in turn, generates the GFCI fault signal. The summing circuit 1400 may comprise a circuit operable to produce a summed output of the upper limit and lower limit signal inputs, such as a conventional summing amplifier, or a digital OR gate, for example. Alternatively, the summing circuit may comprise a common node.

Conversely, if the comparator circuit 1300 does not differentiate between an overvoltage or undervoltage condition, or if the defined tolerance is one of only an overvoltage condition or an undervoltage condition, then the output of the comparator circuit 1300 defines the fault signal.

Figure 7:
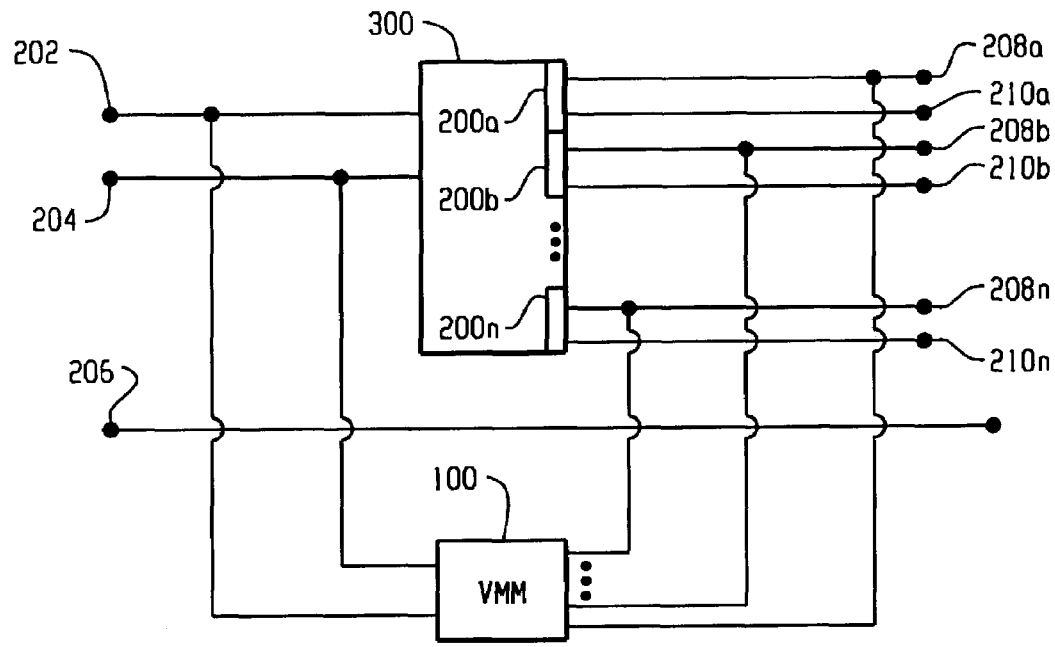
FIG. 7 is a block diagram of a power distribution device utilizing the voltage monitor module.

The voltage monitor module 100 may also be used in combination with a plurality of GFCI devices 200. FIG. 7 provides a block diagram of a power distribution device 300 utilizing the voltage monitor module 100. The power distribution device 300 comprises a plurality of GFCI devices 200*a* . . . *n*, each having a corresponding pair of load side phase and neutral terminals 208*a* . . . *n* and 210*a* . . . *n*. The power distribution terminal 300 receives an input power signal from the line side phase and neutral terminals 202 and 204, and provides as output the plurality of GFCI protected load side phase and neutral terminals 208*a* . . . *n* and 210*a* . . . *n*.

The voltage monitor module 100 may be combined with each GFCI device 200*a* . . . *n* to provide overvoltage and undervoltage interrupt protection and maintain GFCI in the event of an undervoltage or overvoltage condition. The voltage monitor module 100 is operable to monitor the voltage between the line side phase and neutral terminals 202 and 204 and generate fault signals that cause each GFCI device 200*a* . . . *n* to enter the de-energized state when the voltage between the line side phase and neutral terminals 202 and 204 is not within a defined tolerance.

Figure 8:
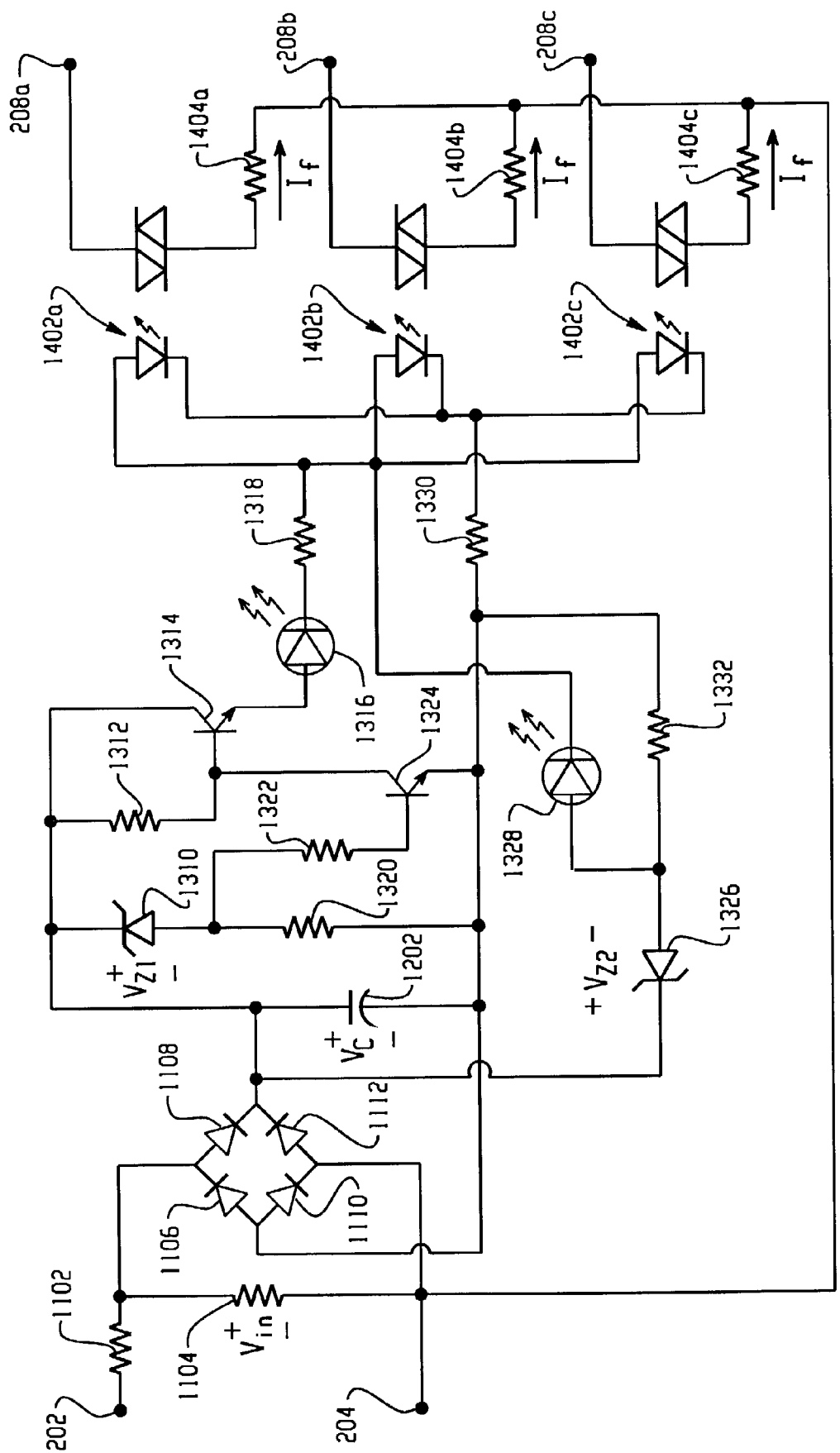
FIG. 8 is a schematic diagram of an exemplary voltage monitor module.

FIG. 8 is a schematic diagram of an exemplary voltage monitor module 100. In the schematic diagram of FIG. 8, the voltage monitor module 100 illustratively provides a ground fault signal for up to three GFCI devices 200*a*, 200*b* and 200c, as represented by load side phase terminals 208a, 208b, and 208c. The voltage monitor module 100 illustratively has three operational modes—an undervoltage mode, a normal voltage mode, and an overvoltage mode.

A power supply voltage, such as a 120V AC signal, is applied across the line side phase and neutral terminals 202 and 204. Resistors 1102 and 1104 form a voltage divider circuit that is operable to scale the power supply voltage to an input reference voltage $V_{in}$ across resistor 1104. The input reference voltage $V_{in}$ is applied to a full wave rectifier defined by diodes 1106, 1108, 1110 and 1112. The full wave rectified voltage is filtered across capacitor 1202, which produces a DC voltage $V_C$.

The voltage $V_C$ is applied to zener diode 1310, which has a first zener breakdown voltage $V_{Z1}$. In the undervoltage operational mode, the voltage $V_C$ is less than the zener voltage $V_{Z1}$, and no current flows through the zener diode 1310. The resistor 1312 and the voltage $V_C$ bias a transistor 1314 on, which produces the lower limit signal. The transistor 1314 conducts through light emitting diode (LED) 1316, load resistor 1318, and the gates of optocoupled triacs 1402a, 1402b and 1402c, and load resistor 1330. The triacs 1402a, 1402b and 1402c thereby turn on, and the resistors 1404a, 1404b and 1404c create series fault circuits between the line side neutral terminal 204 and the load side phase terminal 208a, 208b and 208c, respectively. Corresponding fault currents $I_f$ cause the GFCI devices 200a, 200b and 200c to enter the de-energized state. Light emitted from the LED 1316 also provides a visual indication of an undervoltage condition.

The resistance of resistors 1404a, 1404b and 1404c are preferably selected so that the magnitude of their respective fault currents $I_f$ is large enough to cause each respective GFCI device 200a, 200b, and 200c to enter the de-energized state. For example, if the GFCI devices 200a, 200b and 200c are each class A GFCI devices, then the resistors are preferably matched. Conversely, if the GFCI devices 200a and 200b are Class A GFCI devices, and the GFCI device 200c is a Class B GFCI device, then resistors 1404a and 1404b are preferably matched, while resistor 1404c has a smaller resistance than resistors 1404a and 1404b.

When the voltage $V_C$ becomes greater than the zener voltage $V_{Z1}$, the zener diode 1310 begins to conduct. The resulting voltage across the resistor 1320 is provided to the resistor 1322 which is connected in series to the base of the transistor 1324. Thus, the transistor 1324 begins conducting. When the voltage $V_C$ indicates that the power supply voltage applied across the line side phase and neutral terminals 202 and 204 has a value that is in a normal operational window, i.e., the power supply voltage is within a defined tolerance, then the voltage monitoring module 100 is in a normal voltage operational mode. The transistor 1324 is biased on, which in turn causes transistor 1314 to turn off. Accordingly, triacs 1402a, 1402b and 1402c are off, and no fault current is induced. Thus, the GFCI devices 200a, 200b and 200c may function normally.

Zener diode 1326 has a second zener voltage $V_{Z2}$. In the exemplary voltage monitor module 100 of FIG. 8, the second zener voltage $V_{Z2}$ is greater than the first zener voltage $V_{Z1}$. As the input reference voltage $V_{in}$ increases, the voltage $V_C$ approaches the second zener voltage $V_{Z2}$. When the zener diode 1326 begins conducting, the resulting voltage across resistor 1322 increases. Once LED 1328 becomes forward biased, it begins conducting, which produces the upper limit signal, and the voltage monitor module 100 is operating in the overvoltage operational mode. Current conducts though the gates of optocoupled triacs 1402a, 1402b and 1402c and load resistor 1330. The triacs 1402a, 1402b and 1402c thereby turn on, and the resistors 1404a, 1404b and 1404c created series fault circuits between the line side neutral terminal 204 and the load side phase terminal 208a, 208b and 208c, respectively. Corresponding fault currents $I_f$ cause the GFCI devices 200a, 200b and 200c to enter the de-energized state. Light emitted from the LED 1328 also provides a visual indication of an overvoltage condition.

Thus, according to the exemplary voltage monitor module 100 depicted in FIG. 8, a lower DC voltage threshold $V_L$ may be adjusted by appropriate selection of the zener diode 1310 and thus the corresponding first zener voltage $V_{Z1}$, and the resistor 1320. Likewise, an upper DC voltage threshold $V_U$ may be adjusted by appropriate selection of the zener diode 1326 and thus the corresponding second zener voltage $V_{Z2}$ and the resistor 1332.

While the voltage monitor module 100 of FIG. 8 illustratively provides a fault signal for up to three GFCI devices 200a, 200b and 200c, additional GFCI devices may also be protected. An amplifier may be included to receive the upper limit signal or the lower limit signal to overcome any fan out of limitations of the discrete components shown in FIG. 8.

Furthermore, the exemplary voltage monitor module 100 depicted in FIG. 8 is not limited to the particular circuit components disclosed. For example, while bipolar junction transistors are illustrated, other transistor device may also be used, such as field effect transistors. Likewise, while optocoupled triacs are illustrated, other switching device may also be uses, such as other types of solid state switches, or even electromechanical switches.

Additionally, discrete digital logic components may instead be utilized to realize the functionality of the exemplary voltage monitor module 100 depicted in FIG. 8. For example, the first and second comparators 1302 and 1304 as described with reference to FIG. 6 may be utilized, or, alternatively, discrete logic gates, such as AND and OR gates, may instead be utilized.

Finally, the embodiment of FIG. 8 prevents reactivation of the GFCI device 200 as long as the overvoltage or undervoltage conditions is present. This provides a maximum safety factor, since as long as the overvoltage or undervoltage condition persists, the GFCI device 200 cannot be reset to an energized state. However, many GFCI devices 200 utilize switches 254 and 256 that must be manually reset. Accordingly, in an alternative embodiment, the voltage monitor module 100 may provide the upper limit signal or lower limit signal via timed pulses. The pulses may be provided by known devices, such as a one-shot monostable multivibrator, and are of long enough duration to ensure that the GFCI device 200 will enter the de-energized state. The pulse duration may be selected according to known standards, such as UL 943. For example, at 6 mA, UL 943 requires the GFCI device 200 to interrupt within 5594 msec (5.6 seconds); at 10 mA, 2694 msec (2.7 seconds); at 25 mA, 726 msec (0.73 seconds); and at 250 mA, 25 msec. Thus, by selecting the lower line voltage threshold and appropriate resistor value of resistors 1404, a corresponding pulse duration may be selected and implemented by a one-shot monostable multivibrator.

Figure 9:
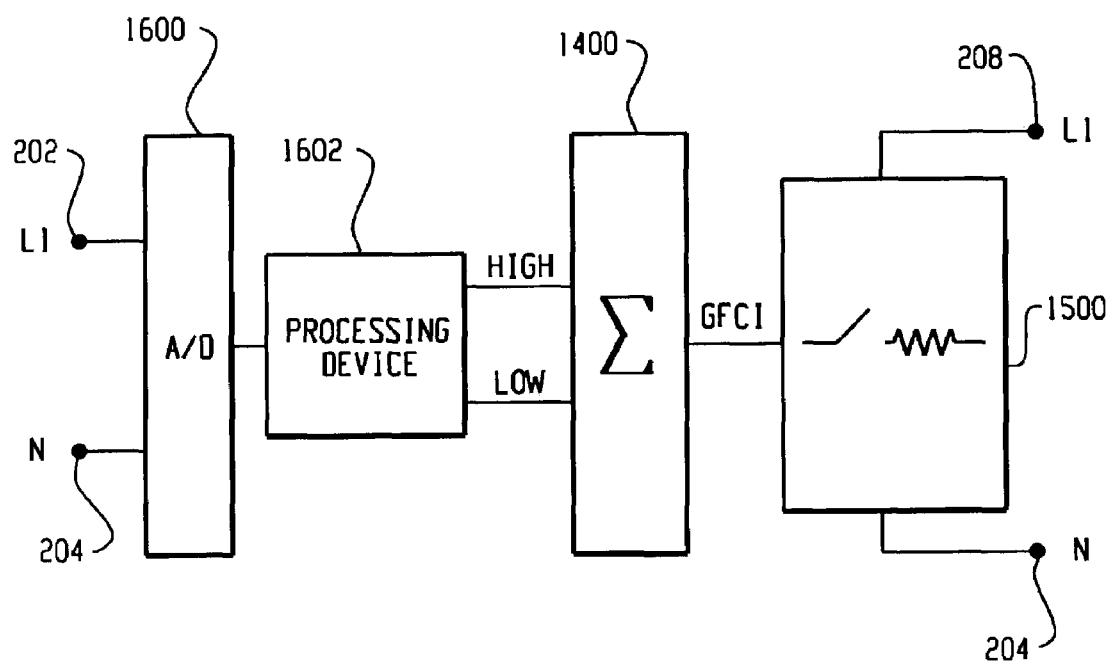
FIG. 9 is a block diagram of another embodiment of the voltage monitor module.

FIG. 9 provides a block diagram of another embodiment of the voltage monitor module 100. In this embodiment, the voltage monitor module 100 includes an analog-to-digital (A/D) converter 1600 and a processing device 1602. The A/D converter 1600 is operable to receive the input power signal from the line side phase and neutral terminals 202 and 204 and output a digital value that corresponds to the magnitude of the input power signal. The digital value is input to the processing device 1602, which determines whether the corresponding voltage between the line side phase and neutral terminals 202 and 204 is within a defined tolerance. For example, if the defined tolerance defines an upper line voltage threshold and a lower line voltage threshold, then the processing device 1602 determines whether the digital value is greater than the corresponding digital value for the lower line voltage threshold or less than the corresponding digital value for the upper line voltage threshold. If the digital value is within this range, then no corresponding upper limit signal or lower limit signal is generated. Conversely, if the digital value is outside this range, then a corresponding lower limit signal is generated if the digital value is less than the corresponding digital value for the lower line voltage threshold, or a corresponding upper limit signal is generated if the digital value is greater than the corresponding digital value for the upper line voltage threshold.

The processing device 1602 may be realized by discrete components, an Application Specific Integrated Circuit (ASIC), a programmable device, such as a microprocessor or controller, or other device operable to realize the described functions.

The embodiments described with reference to FIGS. 1–9 may be utilized in combination with existing GFCI devices 200, thus eliminating or at least minimizing redesign and testing of the GFCI devices.

Furthermore, existing GFCI devices 200, in combination with the voltage monitor module 100, provide open neutral fault protection and overvoltage or undervoltage protection in both single phase and polyphase systems. For example, the voltage monitor module 100 allows ordinary single phase GFCI devices to provide Class "A" protection in a two phase (e.g., 120/240V AC) and 3 phase (e.g., 120/208V AC) power systems, even in the presence of a supply line open-neutral fault. Additionally, a single voltage monitor module 100 may also control a plurality of GFCI devices 200.

Figure 10:
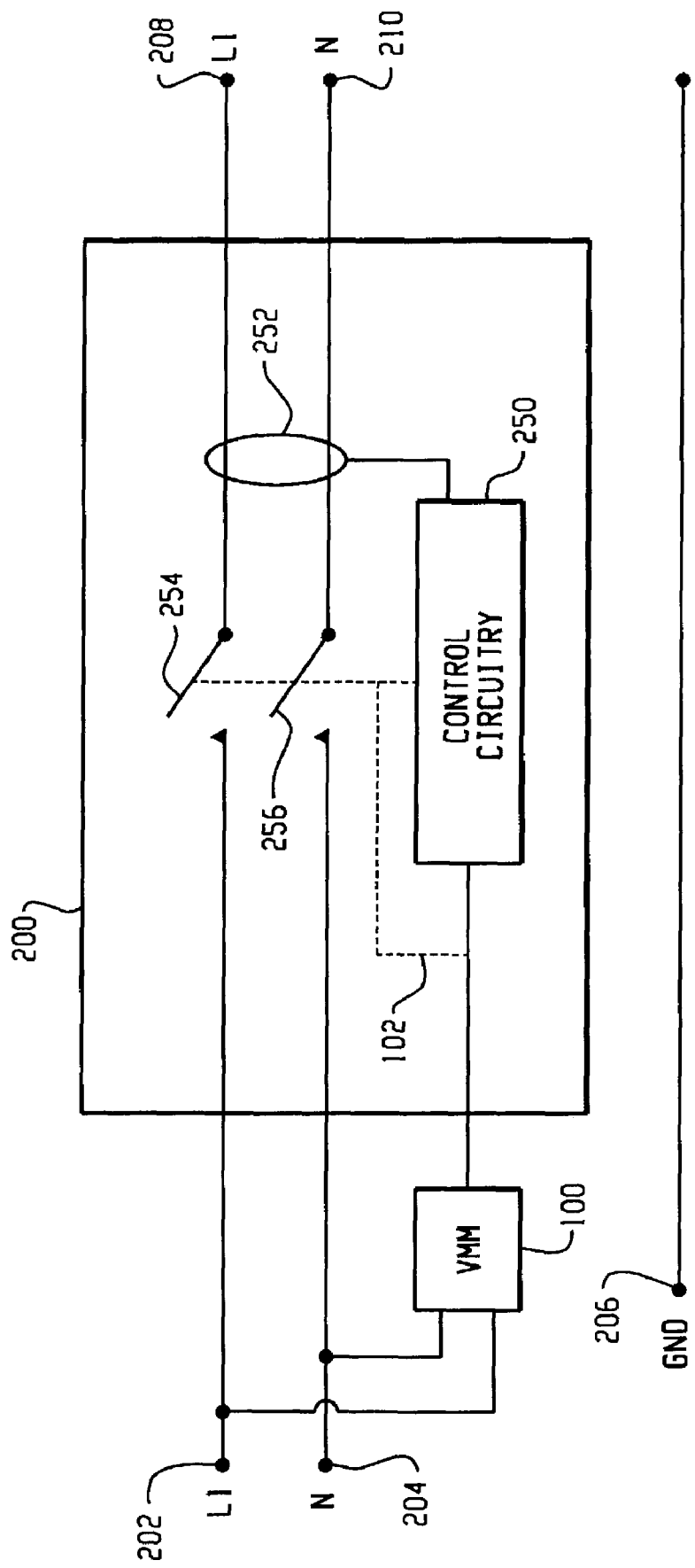
FIG. 10 is a block diagram of another embodiment of the voltage monitor module.

FIG. 10 provides a block diagram of another embodiment of the voltage monitor module 100. In this embodiment, the voltage monitor module is not coupled to the load side neutral terminal 208 of the GFCI device 200. Rather, the voltage monitor module 100 is coupled to the control circuitry 250 of the GFCI device 200, and provides the fault signal directly to the control circuitry 250. The control circuitry 250 then opens switches 254 and 256 in response, thus placing the GFCI device 200 in the de-energized state.

In a variation of the embodiment of FIG. 10, the voltage monitor module 100 is coupled to the switches 254 and 256 of the GFCI device 200, thus bypassing the control circuitry 250. The fault signal activates the switches 254 and 256 directly via the connection 102.

Figure 11:
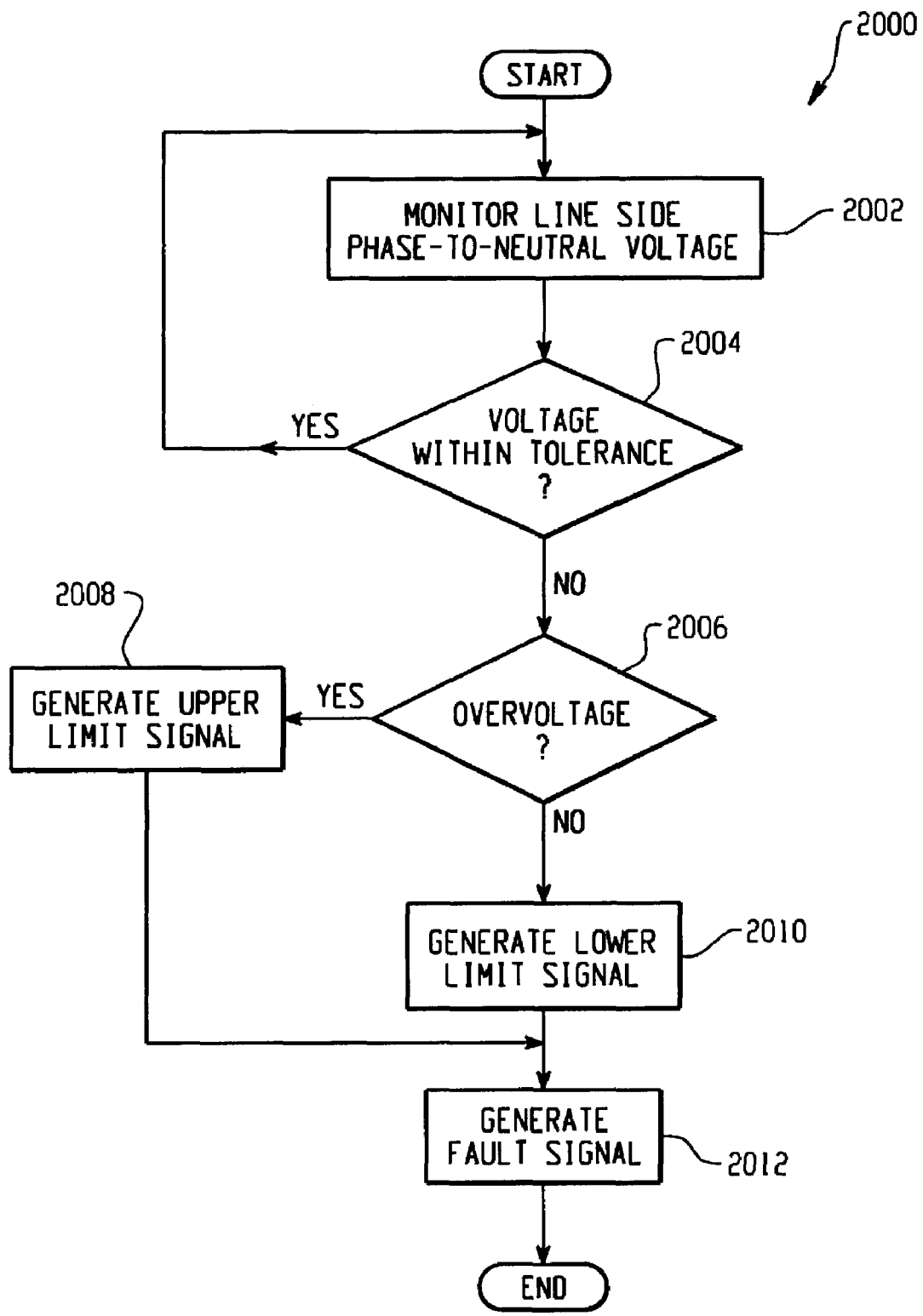
FIG. 11 is a flow diagram of a method of monitoring a line side voltage and generating a fault signal to activate a GFCI device.

FIG. 11 provides a flow diagram 2000 of a method of monitoring a line side voltage and generating a fault signal to activate a GFCI device 200. The method may be realized by the execution of a software module on a processing device, such as microprocessor, or may alternatively be implemented by digital or analog circuit components.

In step 2002, the voltage monitor module 100 monitors the line side phase-to-neutral voltage. In step 2004, the voltage monitor module 100 determines whether the line side phase to neutral voltage is within a tolerance. As described above, the tolerance may be an overvoltage value, an undervoltage value, or a voltage window defined by an overvoltage value and an undervoltage value. For the illustrative method of FIG. 11, the tolerance is defined by an overvoltage value and an undervoltage value.

If the line side phase-to-neutral voltage is within the tolerance, the voltage monitor module 100 returns to step 2002 and continues to monitor the line side phase-to-neutral voltage. If the line side phase-to-neutral voltage is not within the tolerance, however, then the voltage monitor module 100 determines whether the line side phase-to-neutral voltage is greater than the overvoltage value, as shown in step 2006. If the line side phase-to-neutral voltage is greater than the overvoltage value, then the voltage monitor module 100 generates an upper limit signal, as shown in step 2008. Conversely, if the line side phase-to-neutral voltage is not greater than the overvoltage value, then the voltage monitor module generates a lower limit signal, as shown in step 2010. The upper limit signal or the lower limit signal may then be used to provide an indication to the user of the corresponding overvoltage or undervoltage condition.

Finally, in step 2012, the voltage monitor module 100 generates a fault signal that causes the GFCI device 200 to enter a de-energized state. The fault signal may be provided to a fault circuit to induce a fault as previously described. Alternatively, the fault signal may be provided as a control signal to the GFCI device, such as described with reference to FIG. 10. The fault signal may be present for the duration of the overvoltage or undervoltage condition, or, alternatively, may be a pulse signal as previously described.

While the voltage monitor module 100 has been described primarily with respect to monitoring an open neutral condition or an overvoltage/undervoltage condition, other conditions related to the input voltage or input power signal provided to the GFCI device 200 may also be monitored to determine whether to force the GFCI device 200 to enter a de-energized state. For example, harmonic distortion of the input voltage applied to the line side phase and neutral terminals 202 and 204 may be monitored, and if the harmonic distortion exceeds a threshold, then the voltage monitor module 100 can generate the fault signal to force the GFCI device 200 to enter the de-energized state. The voltage monitor module 100 can also be configured to monitor a plurality of input voltage characteristics, such as harmonic distortion, overvoltage/undervoltage conditions, transient conditions, current conditions, and the like, and thus effectively offer additional protection schemes via known GFCI devices.

This written description uses examples to disclose the invention, including the best mode, and also to enable a person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed is:

1. An interrupter circuit for connecting a load on a load side to a power source on a line side, comprising:
    a Ground Fault Circuit Interrupter (GFCI) circuit comprising line side phase and neutral terminals, load side phase and neutral terminals, and control circuitry interposed between the line side phase and neutral terminals and the load side phase and neutral terminals, the control circuitry operable to monitor a current imbalance in the load side phase and neutral terminals and to enter a de-energized state that isolates the load from the power source when the current imbalance exceeds a threshold; and a voltage monitor module operable to monitor a voltage between the line side phase and neutral terminals, and to generate a fault signal that causes the GFCI circuit to enter the de-energized state when the voltage between the line side phase and neutral terminals is not within a defined tolerance;

wherein the defined tolerance defines an upper line voltage threshold and a lower line voltage threshold, and the voltage monitor module is operable to generate the fault signal when the voltage between the line side phase and neutral terminals is greater than the upper line voltage threshold or is lower tan the lower line voltage threshold.

2. The interrupter circuit of claim 1, wherein the voltage monitor module comprises a level detector coupled between the line side phase and neutral terminals, the level detector operable to monitor the voltage between the line side phase and neutral terminals, and to generate an upper limit signal when voltage between the line side phase and neutral terminals is greater than the upper line voltage threshold, and to generate a lower limit signal when the voltage between the line side phase and neutral terminals is less than the lower line voltage threshold.

3. The interrupter circuit of claim 2, wherein the level detector comprises:

a rectifier circuit coupled between the line side phase and neutral terminals and operable to generate a rectified power signal;

an AC/DC converter circuit coupled to the output of the rectifier circuit and operable to generate a DC voltage signal proportional to the magnitude of the rectified power signal; and a comparator circuit coupled to the AC/DC converter circuit and operable to generate the upper limit signal when the DC voltage signal is greater than an upper DC voltage threshold corresponding to the upper line voltage threshold, and to generate the lower limit signal when the DC voltage signal is less than a lower DC voltage threshold corresponding to the lower line voltage threshold.

4. The interrupter circuit of claim 2, wherein the voltage monitor module further comprises a fault circuit coupled to the level detector and operable to generate a fault that causes a current imbalance between the load side phase and neutral terminals in response to the upper limit signal or the lower limit signal.

5. The interrupter circuit of claim 2, wherein the level detector comprises an analog to digital (A/D) converter circuit operable to monitor the voltage between the line side phase and neutral terminals and to generate the upper limit digital signal when voltage between the line aide phase and neutral terminals is greater than the upper line voltage threshold and to generate the lower limit digital signal when the voltage between the line side phase and neutral terminals is lower than the lower line voltage threshold.

6. The interrupter circuit of claim 3, wherein the voltage monitor module further comprises a fault circuit coupled to the comparator circuit and operable to generate a fault that causes a current imbalance between the load side phase and neutral terminals in response to the upper limit signal or the lower limit signal.

7. The interrupter circuit of claim 3, wherein the comparator circuit comprises:

a first zener diode having a first zener voltage proportional to the lower DC voltage threshold; and a second zener diode having a second zener voltage proportional to the upper DC voltage threshold.

8. The interrupter circuit of claim 3, wherein the comparator circuit comprises:

a first comparator coupled to the AC/DC converter circuit and configured to receive the DC voltage signal, to compare the DC voltage signal to the upper DC voltage threshold, and to generate the upper limit signal when the DC voltage signal is greater than the upper DC voltage threshold; and a second comparator coupled to the AC/DC converter circuit and configured to receive the DC voltage signal, to compare the DC voltage signal to the lower DC voltage threshold, and to generate the lower limit signal when the DC voltage signal is less than the lower DC voltage threshold.

9. The interrupter circuit of claim 4, wherein the fault circuit comprises:

a resistor defining first and second ends, the first end coupled to the line side neutral terminal; and a switch interposed between the second end of the resistor and the load side phase terminal, the switch operable to be in a closed state in response to the upper limit signal or the lower limit signal.

10. The interrupter circuit of claim 7, wherein the comparator circuit further comprises a first transistor referenced to the first zener diode and configured to be in an on state when a reverse voltage across the first zener diode is less than the first zener voltage.

11. The interrupter circuit of claim 10, wherein the comparator circuit further comprises a second transistor referenced to the first zone diode and configured to be in an off state when the reverse voltage across the first zener diode is less than the first zener voltage, and configured to be in an on state when a reverse voltage across the first zener diode is greater than the first zone voltage.

12. The interrupter circuit of claim 11, wherein the lower limit signal is generated by the first transistor in the on state.

13. The interrupter circuit of claim 11, wherein the first and second transistors are bipolar junction transistors.

14. The interrupter signal of claim 11, further comprising:

an upper limit indicator operable to generate an upper limit indicator signal upon the generation of the upper limit signal; and a lower limit indicator operable to generate a lower limit indicator signal upon the generation of the lower limit signal.

15. The interrupter circuit of claim 12, further comprising:

a resistor defining first and second ends, the first end coupled to the line side neutral terminal;

a switch interposed between the second end of the resistor and the load side phase terminal, the switch operable to be in a closed state in response to the upper limit signal or the lower limit signal.

16. The interrupter circuit of claim 12, further comprising a current drain interposed between line side neutral terminal and the load side phase terminal, the current drain operable to draw a fault current from the load side phase terminal in response to the upper mint signal or lower limit signal.

17. The interrupter circuit of claim 14, wherein the upper limit indicator and lower limit indicator are light emitting diodes (LEDs).

18. The interrupter circuit of claim 1, wherein the voltage monitor module comprises a fault circuit coupled to the level detector and operable to receive the fault signal and in response generate a fault that causes a current imbalance between the load side phase and neutral terminals.

19. The interrupter circuit of claim 18, wherein the fault circuit comprises:
   a resistor defining first and second ends, the first end coupled to the line side neutral terminal; and
   a switch interposed between the second end of the resistor and the load side phase terminal, the switch operable to be in a closed state when the voltage between the line side phase and neutral terminals is greater than the upper line voltage threshold or is lower than the lower line voltage threshold.

20. The interrupter circuit of claim 18, wherein the fault circuit comprises a current drain interposed between line side neutral terminal and the toad side phase terminal, the current drain operable to draw a fault current from the load side phase terminal when the voltage between the line side phase and neutral terminals is greater than the upper line voltage threshold or is lower than the lower line voltage threshold.

21. The interrupter circuit of claim 1, wherein the voltage monitor module comprises a monitoring circuit comprising first and second input terminals connected to the line side phase and neutral terminals, respectively, and an output terminal connected to the control circuitry of the GFCI circuit, the monitoring circuit operable to provide the fault signal on the output terminal, wherein the fault signal causes the control circuitry to enter the de-energized state.

22. The interrupter circuit of claim 21, wherein the monitoring circuit comprises an analog-to-digital (A/D) converter operable to generate the fault signal when the voltage between the line side phase and neutral terminals is not within the defined tolerance.

23. The interrupter circuit of claim 1, wherein the defined tolerance defines a harmonic characteristic of the voltage between the line side phase and neutral terminals.

24. A voltage monitor module for activating a Ground Fault Circuit Interrupter (GFCI) circuit, the GFCI circuit having load side phase and neutral terminals and line side phase and neutral terminal GFCI circuit being operable to enter a do-energized state to isolate a load connected to the load side phase and neutral terminals from the line side phase and neutral terminals, the voltage monitor module comprising:
   monitoring circuitry coupled to the line side phase and neutral terminals, the monitoring circuitry operable to monitor the voltage between the line side phase and neutral terminals and to generate a fault signal that causes the GFCI circuit to enter a de-energized state when the voltage between the line side phase and neutral terminals is not within a defined tolerance; and
   fault circuitry operable to receive the fault signal and to generate a fault current that causes the GFCI circuit to enter the de-energized state;
   wherein the defined tolerance defines an upper line voltage threshold and a lower line voltage threshold, and the monitoring circuitry is operable to generate the fault signal when the voltage between the line side phase and neutral terminals is greater than the upper line voltage threshold or is lower than the lower line voltage threshold.

25. The voltage monitor module of claim 24, wherein the monitoring circuitry comprises a level detector coupled between the line side phase and neutral terminals, the level detector operable to monitor the voltage between the line side phase and neutral terminals and to generate an upper limit signal when voltage between the line side phase and neutral terminals is greater than the upper line voltage threshold and to generate a lower limit signal when the voltage between the line side phase and neutral terminals is less than the lower line voltage threshold.

26. The voltage monitor module of claim 24, wherein the fault circuitry comprises:
   a resistor defining first and second ends, the first end coupled to the line side neutral terminal; and
   a switch interposed between the second end of the resistor and the load side phase terminal, the switch operable to be in a closed state when the voltage between the line side phase and neutral terminals is greater than the upper line voltage threshold or is lower than the tower line voltage threshold.

27. The voltage monitor module of claim 24, wherein the fault circuitry comprises a current drain interposed between line side neutral terminal and the load side phase terminal, the current drain operable to draw a fault current from the load side phase terminal when the voltage between the line side phase and neutral terminals is greater than the upper line voltage threshold or is lower than the lower line voltage threshold.

28. The voltage monitor module of claim 24, wherein the fault current has a magnitude to actuate a Class B GFCI.

29. The voltage monitor module of claim 24, wherein the monitoring circuitry comprises an output terminal connected to the control circuitry of the GFCI circuit, the monitoring circuitry operable to provide the fault signal on the output terminal, wherein the fault signal causes the control circuitry to eater the de-energized state.

30. The voltage monitor module of claim 24, wherein the defined tolerance defines a harmonic characteristic of the voltage between the line side phase and neutral terminals.

31. The voltage monitor module of claim 25, wherein the level detector comprises:
   a rectifier circuit coupled between the line side phase and neutral terminals and operable to generate a rectified power signal;
   an AC/DC convener circuit coupled to the output of the rectifier circuit and operable to generate a DC voltage signal proportional to the magnitude of the rectified power signal;
   a comparator circuit coupled to the AC/DC converter circuit and operable to generate the upper limit signal when the DC voltage signal is greater than an upper DC voltage threshold corresponding to the upper line voltage threshold, and to generate the lower limit signal when the DC voltage signal is less than a lower DC voltage threshold corresponding to the lower line voltage threshold.

32. The voltage monitor module of claim 25, further comprising:
   an upper limit indicator operable to generate an upper limit indicator signal upon the generation of the upper limit signal; and
   a lower limit indicator operable to generate a lower limit indicator signal upon the generation of the lower limit signal.

33. The voltage monitor module of claim 25, wherein the level detector comprises an analog to digital (A/D) converter circuit operable to monitor the voltage between the line side phase and neutral terminals and to generate the upper limit digital signal when voltage between the line side phase and neutral terminals is greater tan the upper line voltage threshold and to generate the lower limit digital signal when the voltage between the line side phase and neutral terminals is lower than the lower line voltage threshold.

34. The voltage monitor module of claim 25, wherein the fault circuitry comprises:
a resistor defining first and second ends, the first end coupled to the line side neutral terminal; and
a switch interposed between the second end of the resistor and the load side phase terminal, the switch operable to be in a closed state in response to the upper limit signal or the lower limit signal.

35. The voltage monitor module of claim 28, wherein the fault current is drained from the load side phase terminal.

36. The voltage monitor module of claim 29, wherein the monitoring circuitry comprises an analog-to-digital (A/D) converter operable to generate the fault signal when the voltage between the line side phase and neutral terminals is not within the defined tolerance.

37. The voltage monitor module of claim 31, wherein the comparator circuit comprises:
a first zener diode having a first zener voltage proportional to the lower DC voltage threshold; and
a second zener diode having a second zener voltage proportional to the upper DC voltage threshold.

38. The voltage monitor module of claim 31, wherein the comparator circuit comprises:
a first comparator coupled to the AC/DC converter circuit and configured to receive the DC voltage signal, to compare the DC voltage signal to the upper DC voltage threshold, and to generate the upper limit signal when the DC voltage signal is greater than the upper DC voltage threshold; and
a second comparator coupled to the AC/DC converter circuit and configured to receive the DC voltage signal, to compare the DC voltage signal to the lower DC voltage threshold, and to generate the lower limit signal when the DC voltage signal is less than the lower DC voltage threshold.

39. The voltage monitor module of claim 37, wherein the comparator circuit further comprises a first transistor referenced to the first zener diode and configured to be in an on state when a reverse voltage across the first zener diode is less than the first zener voltage.

40. The voltage monitor module of claim 39, wherein the comparator circuit further comprises a second transistor referenced to the first zener diode and configured to be in an off state when the reverse voltage across the first zener diode is less than the first zener voltage and configured to be in an on state when a reverse voltage across the first zener diode is greater than the first zener voltage.

41. A system for generating a fault signal to activate a Ground Fault Circuit Interrupter (GFCI) circuit, the GFCI circuit having load side phase mud neutral terminals and line side phase and neutral terminals the GFCI circuit being operable to enter a de-energized state to isolate a load connected to the load side phase and neutral terminals from the line side phase and neutral terminals, the system comprising:
monitoring means for monitoring the voltage between the line side phase and neutral terminals of the GFCI circuit and for generating a fault signal when the voltage between the line side phase and neutral terminals is not within a defined tolerance; and
coupling means for coupling the monitoring means to the GFCI circuit;
wherein the coupling means comprises fault means for generating a fault current in response to the fault signal that causes the GFCI circuit to enter the de-energized state;
the monitoring means is further adapted for defining the defined tolerance by selecting an upper line voltage threshold and a lower line voltage threshold; and
the fault means is farther adapted for generating the fault current when the voltage between the line side phase and neutral terminals is greater than the upper line voltage threshold or is lower than the lower line voltage threshold.

42. The system of claim 41, wherein die monitoring means comprises level detector means coupled between the line side phase and neutral terminals, the level detector means for monitoring the voltage between the line side phase and neutral terminals and for generating an upper limit signal when the voltage between the line side phase and neutral terminals is greater than the upper line voltage threshold and for generating a lower limit signal when the voltage between the line side phase and neutral terminals is lower than the lower line voltage threshold.

43. The system of claim 41, wherein the coupling means comprises connecting means for providing the fault signal to the GFCI circuit, wherein the fault signal causes the GFCI circuit to enter the de-energized state.

44. The system of claim 42, wherein the level detector means comprises:
rectifier means coupled between the line side phase and neutral terminals, the rectifier means for generating a rectified power signal;
AC/DC converter means coupled to the output of the rectifier means, the AC/DC converter means for generating a DC voltage signal proportional to the magnitude of the rectified power signal; and
comparator means coupled to the AC/DC converter means, the comparator means for generating an upper limit signal when the DC voltage signal is greater than an upper DC voltage threshold corresponding to the upper line voltage threshold, and for generating the lower limit signal when the DC voltage signal is less than a lower DC voltage threshold corresponding to the lower line voltage threshold.

45. A method for generating a fault signal to activate a Ground Fault Circuit Interrupter (GFCI) circuit having load side phase and neutral terminals and line side phase and neutral terminals and operable to enter a de-energized state to isolate a load connected to the load side phase and neutral terminals from the line side phase and neutral terminals, the method comprising:
monitoring the voltage between the line side phase and neutral terminals of the GFCI circuit;
comparing the voltage monitored between the line side phase and neutral terminals to a tolerance criteria; and
generating a fault signal that causes the GFCI circuit to enter the de-energized state when the voltage monitored between the line side phase and neutral terminals does not meet the tolerance criteria;
wherein the step of comparing the voltage monitored between line side phase and neutral terminals to a tolerance criteria comprises the steps of:
defining an upper voltage threshold; and defining a lower voltage threshold.

46. The method of claim 45, wherein the step of monitoring the voltage between line side phase and neutral terminals of the GFCI circuit comprises the steps of:
rectifying the voltage between line side phase and neutral terminals of the GFCI circuit; and
converting the rectified voltage to a proportional DC value.

47. The method of claim 45, wherein the step of generating a fault signal that causes the GFCI circuit to enter the de-energized state when the voltage monitored between the line side phase and neutral terminals does not meet the tolerance criteria comprises the step of creating a fault between the load side phase terminal and the line side neutral terminal.

48. The method of claim 47, wherein the fault generates a fault current having a magnitude to actuate a Class B GFCI.

49. The method of claim 45, wherein the step of generating a fault signal that causes the GFCI circuit to enter the de-energized state when the voltage monitored between the line side phase and neutral terminals does not meet the tolerance criteria comprises the step creating a current imbalance between a load side phase terminal and a load side neutral terminal.

* * * * *